US008915626B2

(12) United States Patent
Lettermann (10) Patent No.: US 8,915,626 B2
(45) Date of Patent: Dec. 23, 2014

(54) LASER BEAM TRANSMITTER LIGHTHOUSE (75) Inventor: Gert Lettermann, Rodenbach (DE)

(73) Assignee: Trimble Kaiserslautern GmbH, Kaiserlautern (DE)

( * ) Notice: Subject to any disclaimer, the term of this patent is extended or adjusted under 35 U.S.C. 154(b) by 2896 days.

(21) Appl. No.: 11/130,831

(22) Filed: May 17, 2005

(65) Prior Publication Data

US 2006/0158709 A1 Jul. 20, 2006

Related U.S. Application Data (63) Continuation of application No. 11/039,205, filed on Jan. 19, 2005, now abandoned.

(51) Int. Cl.
*F21S 10/06* (2006.01)
*G01S 1/70* (2006.01)
*G01C 15/00* (2006.01)

(52) U.S. Cl.
CPC ................ *G01S 1/70* (2013.01); *G01C 15/004* (2013.01)
USPC .......................... 362/382; 362/431; 362/153.1

(58) Field of Classification Search
USPC .............. 362/382, 431, 433, 153.1, 259, 269; 359/198, 212; 52/248; 356/248, 149
See application file for complete search history.

(56) References Cited

U.S. PATENT DOCUMENTS

| 1,486,357 | A | * | 3/1924 | Sandbrook ..................... 362/362 |
| 2,449,875 | A | * | 9/1948 | Cadwallader ................... 52/208 |
| 3,521,048 | A | * | 7/1970 | Fowler ........................ 362/330 |
| 4,062,634 | A | * | 12/1977 | Rando et al. .................. 356/248 |
| 4,662,707 | A |   | 5/1987 | Teach et al. |
| 4,776,672 | A |   | 10/1988 | Rando et al. |
| 4,807,090 | A | * | 2/1989 | Mandellos et al. ............. 362/26 |
| 6,128,326 | A |   | 10/2000 | Kousek et al. |
| 6,195,901 | B1 |  | 3/2001 | Falb |
| 7,109,880 | B2 | * | 9/2006 | Sibalich et al. ............. 340/693.6 |

FOREIGN PATENT DOCUMENTS

| DE | 19648867 A1 | 5/1998 |
| DE | 69423020 T2 | 9/2000 |
| EP | 0 619 502 A2 | 10/1994 |

OTHER PUBLICATIONS

German Office Action (translation) dated Feb. 8, 2010 corresponding to related German Application No. 11 2005 003 367.8-52.

* cited by examiner

*Primary Examiner* — Sharon Payne (57) ABSTRACT

A laser transmitter projects a beam of laser light and rotates the beam about an axis which is generally normal to the beam. The transmitter includes a laser beam source, and a lighthouse. The lighthouse encloses, at least in part, the laser beam source while permitting the beam of laser light to be projected there through. The lighthouse includes a plurality of transparent panels, and a panel support of elastomeric material. The panel support engages the plurality of transparent panels and supports them in a peripheral configuration such that they surround the laser beam source.

16 Claims, 5 Drawing Sheets

LASER BEAM TRANSMITTER LIGHTHOUSE

CROSS-REFERENCE TO RELATED APPLICATIONS

This application is a continuation of U.S. patent application Ser. No. 11/039,205 filed Jan. 19, 2005.

STATEMENT REGARDING FEDERALLY SPONSORED RESEARCH OR DEVELOPMENT

Not applicable

BACKGROUND OF THE INVENTION

This invention relates to apparatus for providing a reference laser beam and, more particularly, to a laser beam transmitter having an improved lighthouse structure. The lighthouse of the present invention effectively seals the transmitter against moisture and dirt. Further, this lighthouse is rugged, while also facilitating repair should a glass panel be broken during use of the transmitter.

Laser beam systems have been employed in numerous surveying and construction applications. In one such system, disclosed in U.S. Pat. No. 4,062,634, issued to Rando et al, a laser beam transmitter produces a rotating laser beam which establishes a reference plane. The reference plane swept by the rotating beam is used as an elevational reference over an entire work area, such as for example a construction site. Also, the system employs one or more laser beam detectors, placed at considerable distances from the transmitter, for intercepting the rotating laser beam in the reference plane. These detectors may be carried on earthmoving equipment and used by the operators of the equipment to determine proper elevation at various points throughout the work area.

In a laser beam transmitter of this type, the horizontal rotating reference laser beam is produced by projecting the beam generally upward, and then redirecting it ninety degrees within a pentaprism assembly. The pentaprism assembly, which typically uses a pair of mirrors rather than a prism to produce the needed double reflection, is rotated about a vertical axis within the projecting apparatus to cause the resulting horizontal beam to rotate, thereby defining the reference plane. If desired, the beam may be rotated in a plane that is tilted by a specified amount with respect to horizontal, thereby providing a tilted reference plane.

To adapt the reference laser beam transmitter for use in surveying and construction applications under a variety of field conditions, the transmitter is provided with a waterproof housing having an upper, transparent lighthouse assembly within which the pentaprism assembly rotates and through which the laser beam is projected. In the transmitter shown in the '634 patent, the lighthouse assembly includes four upstanding flat transparent panes of glass of high optical quality which are joined together at their side edge surfaces so as to form a square in cross section. The lower edges of the panes are mounted within recessed seats formed in an upper rim of the housing, while the upper edges of the panes are mounted within recessed seats formed within a top casing of the housing. Gaskets seal the upper and lower edges of the panes. Four posts extend between the top casing of the housing and upper rim of the housing and apply sufficient compressive force to pull them together and lock the panes into their seats. The four posts are aligned radically outward from the corners of the lighthouse assembly. Where the panes meet at the corners they have forty-five degree beveled side edges that mate and are further sealed by a suitable adhesive, such as a silicone adhesive.

While this lighthouse construction performs well, it requires careful grinding of the individual glass panes to precise dimensions to bevel the side edge surfaces that form the corner junctures of the lighthouse. The assembly of the lighthouse also requires precise positioning of the panes relative to one another, before they were adhered together. Additionally, this lighthouse construction is not as rugged as might be desired. Several lighthouse constructions have been used to overcome these difficulties. One such construction, similar to that in the '634 patent, is shown in U.S. Pat. No. 4,776,672, issued Oct. 11, 1988. In the lighthouse to which the '672 patent is directed, a plurality of transparent panes are arranged in a generally polygonal cross-sectional shape. The window structure has spaced corners formed by pairs of adjacent ones of the opposite side edge portions of the panes. The side edge portions of the panes in each pair are offset relative to one another in forming a respective corner. The offset position of the side edge portions of each pair in forming a respective corner exposes only an interior edge on one of the adjacent side edge portions to laser light being transmitted through the window structure. The path of laser light through the adjacent side edge portions forming the corner is thereby affected only by one interior edge on the respective one of the adjacent side edge portions of the panels at each corner. This reduces the care with which the edges of the panes must be adhesively bonded, but does not deal with the issue of ruggedness.

Another lighthouse construction is shown in U.S. Pat. No. 4,662,707, issued May 5, 1987. The '707 patent discloses a lighthouse configured as a cylindrical lighthouse of molded acrylic resin. The lighthouse has no corners and, therefore, no problems of the type associated with joining together flat panes at the corners. A difficulty with the cylindrical configuration, however, is that the rays of laser light at the periphery of the beam will tend to diverge laterally from the center of the beam after being refracted twice as they pass through the lighthouse. To overcome this difficulty, an additional correction lens is provided in the '707 transmitter, to minimize the generally horizontal beam divergence. While this effectively eliminates several limitations encountered with respect to prior art lighthouses, it also requires the addition of a component, the lens, and the resulting inaccuracies.

Accordingly, it is seen that there is a need for an improved lighthouse construction in which additional optical components are not required. Further, there is a need for a lighthouse construction in which the lighthouse is rugged, and easily constructed.

SUMMARY OF THE INVENTION

These difficulties are overcome by a laser transmitter, and a lighthouse for such a transmitter, constructed according to the present invention. The laser transmitter projects a beam of laser light and rotates the beam about an axis that is generally normal to the beam. The transmitter includes a lighthouse for enclosing the laser beam source, at least in part. The lighthouse, which permits the beam of laser light to be projected there through, includes a plurality of transparent panels.

The panels may be held in place by a panel support of elastomeric material in a peripheral configuration such that they surround the laser beam source. Each of the transparent panels has a trapezoid shape, with upper and lower parallel edges, with the upper edge being shorter than the lower edge. Each of the transparent panels has an isosceles trapezoid shape with right and left non-parallel edges. The right and left non-parallel edges are beveled.

The panel support of elastomeric material engages the plurality of transparent panels and supports the panels in a peripheral configuration such that they surround the laser beam source. The panel support defines a plurality of openings for receiving the transparent panels. The plurality of panels comprises four panels, each generally trapezoidal in shape, and the plurality of openings comprises four trapezoidal openings. Preferably, each of the panels has an isosceles trapezoid shape and substantially parallel upper and lower edges. The upper edge is shorter than the lower edge, and the panels further have right and left non-parallel beveled edges. The panel support defines retaining grooves along at least some of the edges of each of the four trapezoidal openings. The panels are received into the grooves and held in place in the panel support.

Accordingly, it is an object of the present invention to provide an improved, more rugged lighthouse construction for a laser transmitter. Other objects and advantages of the invention will be apparent from the following description, the accompanying drawings, and the appended claims.

DETAILED DESCRIPTION OF THE PREFERRED EMBODIMENT

Figure 1:
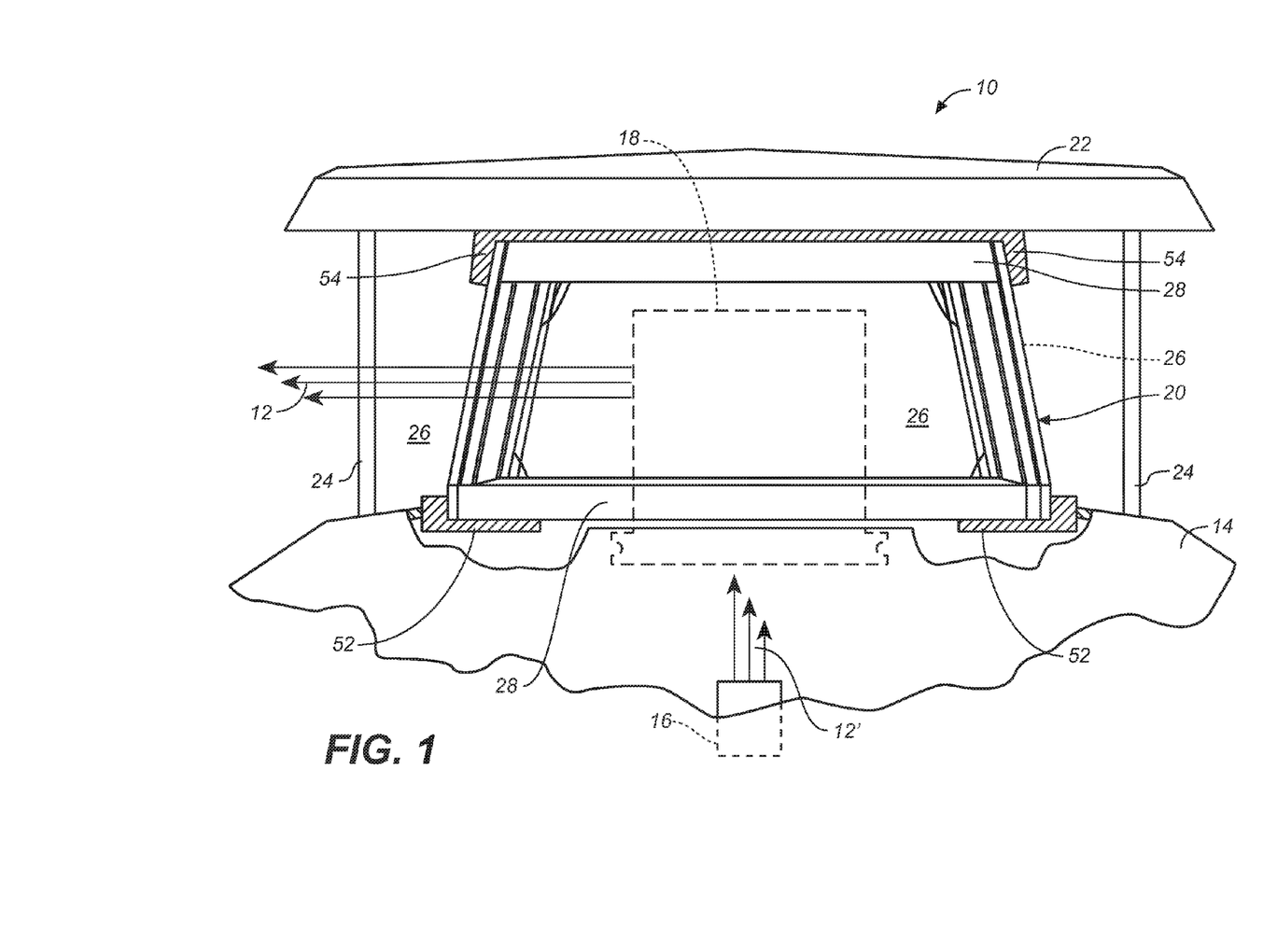
FIG. 1 is a side view of a portion of a laser transmitter constructed according to the present invention, with portions broken away and in section to reveal interior structure.
Figure 2:
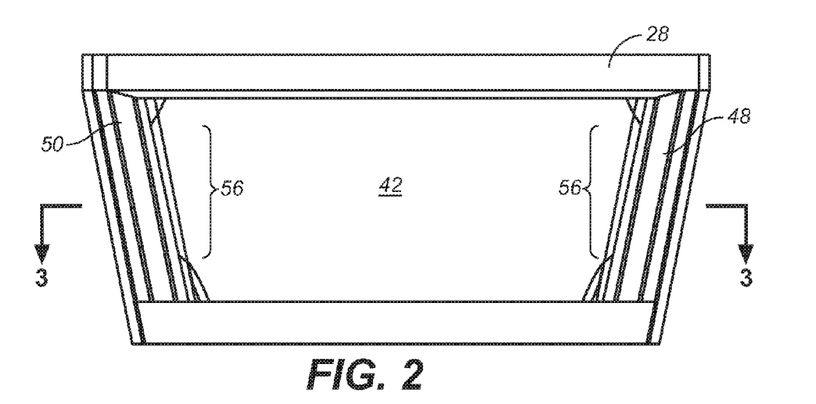
FIG. 2 is a side view of a lighthouse panel support according to the present invention.
Figure 3:
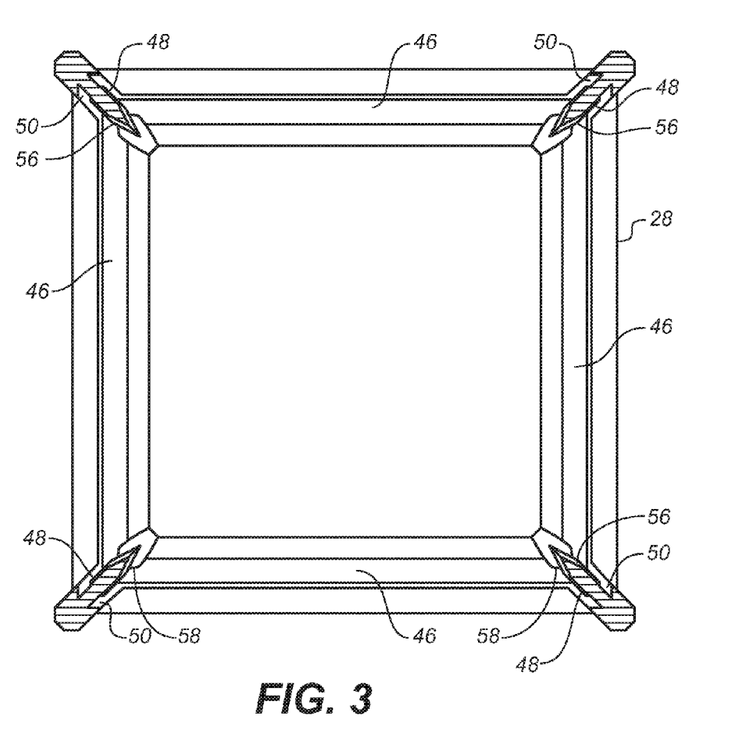
FIG. 3 is a sectional view of the lighthouse panel support of FIG. 2, taken generally along line 3-3 in FIG. 2.
Figure 4:
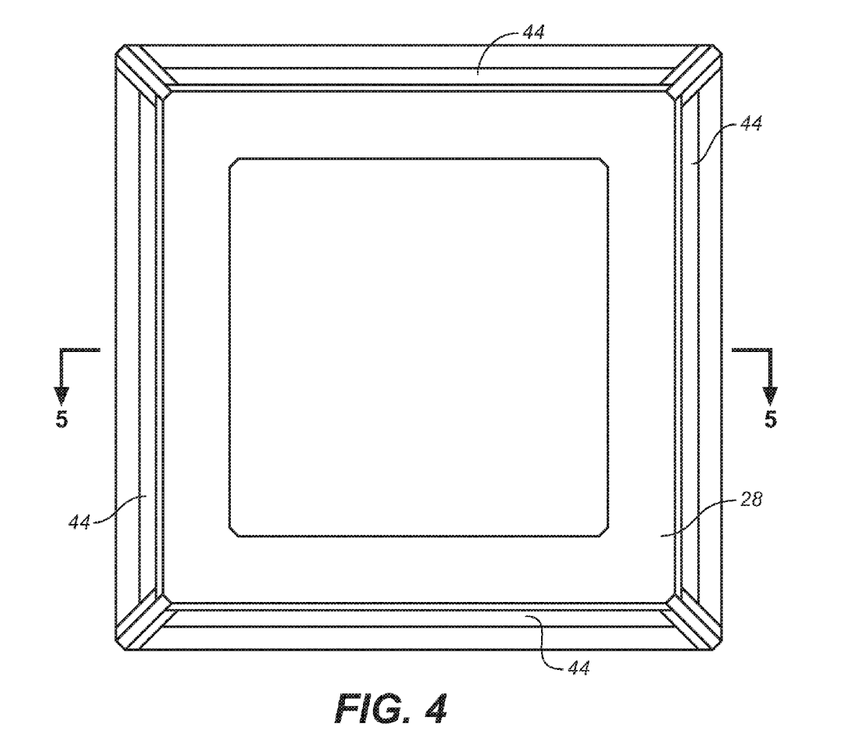
FIG. 4 is a top plan view of the lighthouse panel support of FIG. 2.
Figure 5:
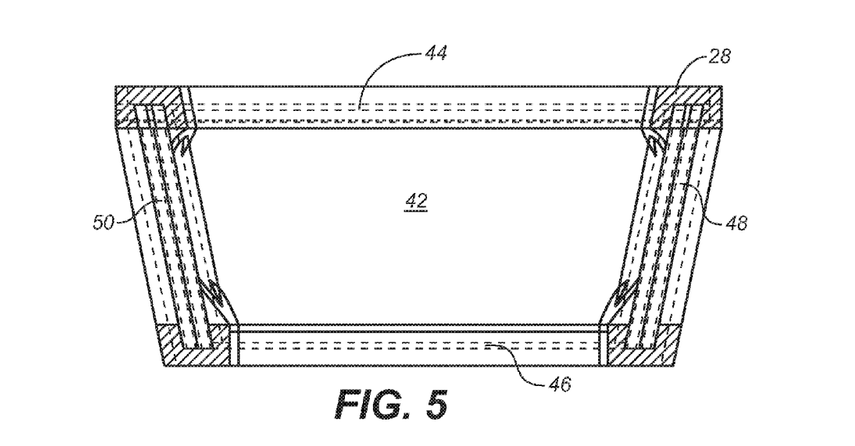
FIG. 5 is a sectional view of the lighthouse panel support of FIG. 4, taken generally along line 4-4 in FIG. 4.

The present invention relates to an improved laser transmitter and an improved lighthouse for use in such transmitters. Reference is made to FIG. 1 of the drawings, which shows a laser transmitter 10 constructed according to the present invention for projecting a beam 12 of laser light in a reference plane. The apparatus 10 includes a housing 14, a laser 16 in the housing 14 for generating the laser beam 12, and a beam diverting assembly 18 mounted for receiving the laser beam 12' from the laser 16 and deflecting the laser beam outwardly from the housing in the reference plane as beam 12. The laser 16 may be any laser beam source, such as, for example, a helium-neon gas laser with appropriate optics for producing a low-power collimated output beam in the red band of the light spectrum. The beam diverting assembly 18 is preferably a pentaprism assembly which redirects light beam 12' in a perpendicular direction as beam 12. As is known, the pentaprism assembly has a pair of reflecting surfaces (not shown) which are accurately aligned to divert the beam from the vertical axis to a direction perpendicular thereto.

The transmitter 10 has an arrangement, including a motor (not shown), for rotating the beam diverting assembly 18 about a vertical axis. As the assembly 18 is rotated, the beam 12 is rotated about the vertical axis and swept through the horizontal reference plane.

A lighthouse 20 overlies the beam diverting assembly 18. The lighthouse 20 is mounted on the housing 14 to allow transmission of the laser beam 12 therethrough, while sealing the housing 14 in conjunction with a lighthouse cover 22. The cover 22 is supported over the lighthouse 20 by posts 24 which extend between the housing and the cover at the corners of the lighthouse 20. The lighthouse 20 includes a plurality of transparent panels 26 arranged circumferentially around the beam diverting assembly 18, and a panel support 28 of elastomeric material for holding the transparent panels 26 in position.

Figure 6:
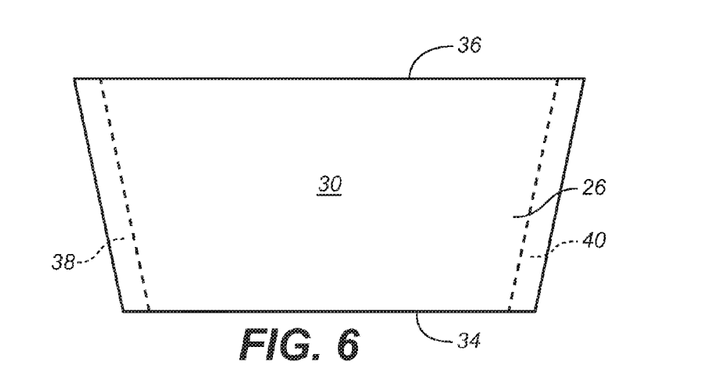
FIG. 6 is a front view of a transparent panel used in the lighthouse of FIG. 2.
Figure 7:
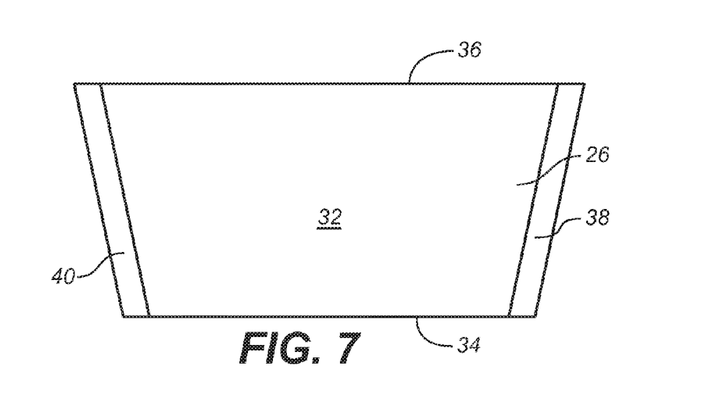
FIG. 7 is a rear view of a transparent panel used in the lighthouse of FIG. 2.
Figure 8:
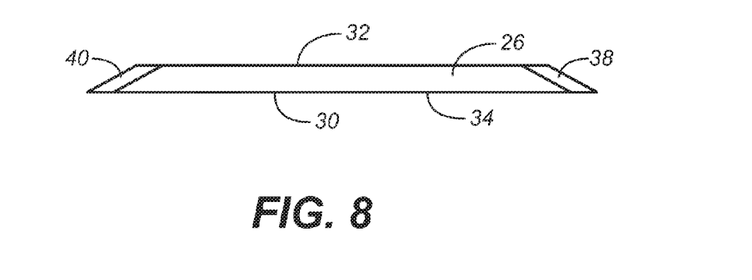
FIG. 8 is a top view of a transparent panel used in the lighthouse of FIG. 2.
Figure 9:
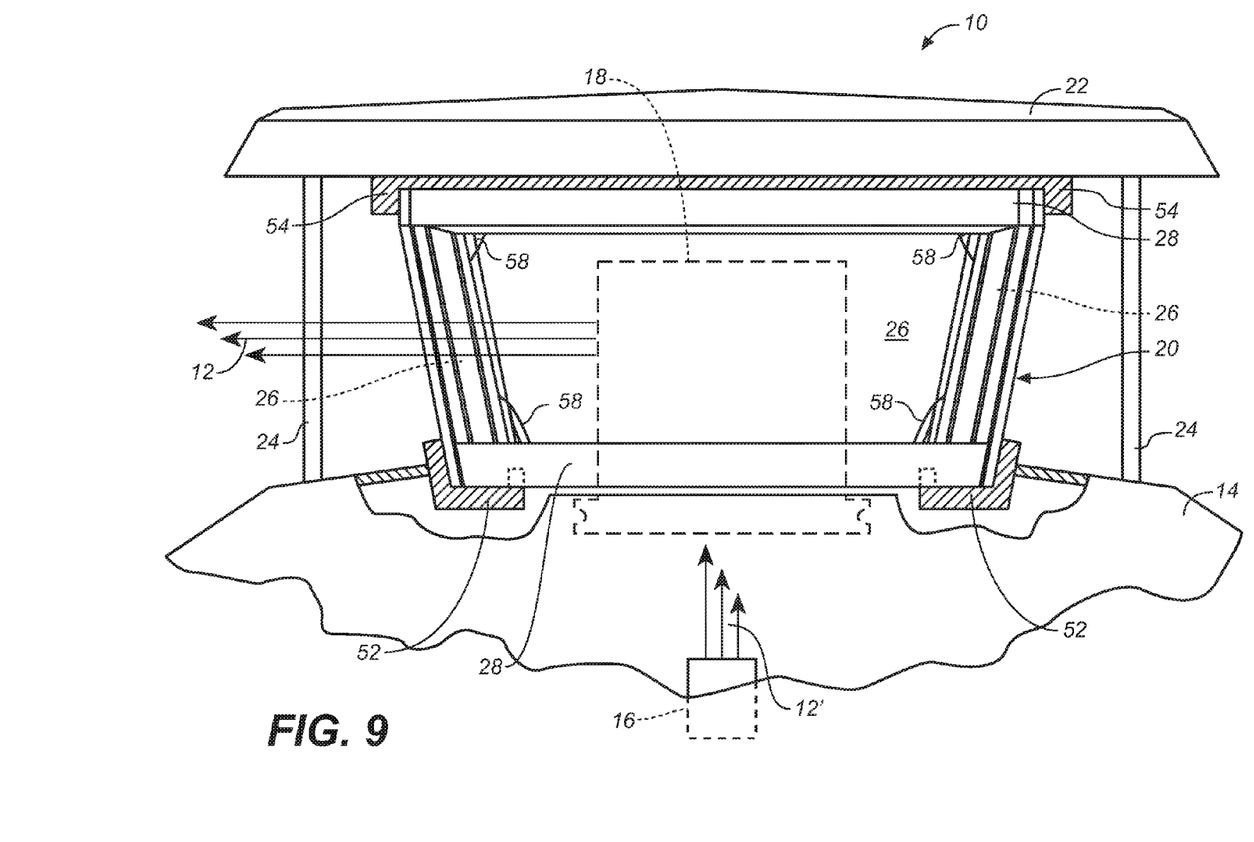
FIG. 9 is a side view of a second embodiment of a transmitter, with an inverted lighthouse, and with portions broken away to reveal interior structure.

One of the transparent panels 26 is shown in FIGS. 6-8. The panel 26, preferably made of optical grade glass, has a front surface 30 and rear surface 32. Surfaces 30 and 32 are substantially parallel to each other so that any refraction experienced by the beam 12 entering the panel 26 is offset by an equal and substantially opposite refraction experienced by the beam 12 as it exits the panel 26. As illustrated in FIGS. 6 and 7, each of the transparent panels 26 is shaped substantially as an isosceles trapezoid having upper and lower parallel edges 34 and 36, respectively. The upper edges 34 are shorter than the lower edges 36. Each of the transparent panels 26 also has right and left non-parallel, beveled edges 38 and 40, respectively. It should be appreciated that the upper edges 34 are shorter than the lower edges 36 because the transparent panels are not vertically positioned in the lighthouse 20, but are pitched rearward slightly, as shown in FIG. 1. The lighthouse 20 could, however, have transparent panels that tilt back slightly if desired, in which case the lower edges of the panels would be longer than their upper edges. Such a lighthouse construction is shown in FIG. 9, in which structures that correspond to structures in FIG. 1 are given like reference numerals.

The lighthouse panel support 28 is made of an elastomeric material that holds the transparent panels 26 in position in the lighthouse. As seen in FIGS. 2-5, the panel support 28 defines a plurality of trapezoidal openings 42 that receive the transparent panels 26. The panel support 28 further defines retaining grooves 44, 46, 48, and 50 along the edges of each of the trapezoidal openings. The panels 26 are received into these grooves and held in place.

Because the openings 42 and surrounding grooves are the same size as the panels 26, each panel is inserted into a corresponding opening in the support 28 by stretching and deforming the panel support 28 slightly, temporarily enlarging an opening 42. The panel support 28 then returns to its unreformed shape and firmly securely engages the periphery of the panel, forming a seal around the panel periphery at the same time. It will be noted that after the panels 26 are mounted in the openings 42 in the lighthouse panel support 28, the elastomeric support 28 is positioned on the housing 14 such that its lower edge is received into a mating seat 52 (FIG. 1). The sealing of the lighthouse 20 is then completed by lighthouse cover 22 and mating seat 54 that engages and seals the top edge of the support 28.

The panel support 28 of elastomeric material supports the four transparent panels 26 in a peripheral configuration such that they surround the laser beam source 16. The openings 42 of the panel support are beveled and narrowed at 56 to minimize the amount of the beam 12 that is blocked as the beam 12 is swept past the edges of each of the openings 42. Note that at the top and bottom of the grooves 48 and 50, at points were the beam 12 will be unaffected, the support 28 defines shoulders 58 which add additional backing to support the side edges 38 and 40 of the panels 26.

The lighthouse of the present invention has a number of advantages. First, it is extremely rugged. If the transmitter is inadvertently subject to an impact, such as for example would result from being dropped, the support 28, made of elastomeric material, cushions the impact to the panels. This makes it less likely that a panel will be broken than is the case with a lighthouse in which there is glass-to-glass contact at the lighthouse corners. Further, if a panel should be damaged during operation of the transmitter, the transmitter need not be taken out of service for an extended period for repairs. No adhesive is required to replace a transparent panel, and this can be accomplished with relative ease.

While certain representative embodiments and details have been shown for purposes of illustrating the invention, it will be apparent to those skilled in the art that various changes in the business form disclosed herein may be made without departing from the scope of the invention, which is defined in the appended claims.

What is claimed is:

1. A laser transmitter for projecting a beam of laser light and rotating said beam about an axis which is generally normal to said beam, comprising:
    a laser beam source, and
    a lighthouse for enclosing, at least in part, said laser beam source while permitting said beam of laser light to be projected there through, said lighthouse including a plurality of transparent panels, each panel having a four sided shape with four panel edges, and a panel support of elastomeric material for engaging said plurality of transparent panels and supporting said panels, said panel support defining a plurality of openings, each transparent panel being mounted in one of said openings and held therein by retaining grooves in said support that extend along all of the edges of said opening, whereby each of said panels is received into said grooves and held in place in said panel support along the full extent of each of said four panel edges.

2. The laser transmitter of claim 1 in which said panel support of elastomeric material engages said plurality of transparent panels and supports said panels in a peripheral configuration such that they surround said laser beam source, and in which each of said transparent panels has a trapezoid shape, with upper and lower parallel edges, with said upper edge being shorter than said lower edge.

3. The laser transmitter of claim 2 in which each of said transparent panels has an isosceles trapezoid shape with right and left non-parallel edges, and in which the right and left non-parallel edges are beveled.

4. The laser transmitter of claim 1 in which said panel support of elastomeric material engages said plurality of transparent panels and supports said panels in a peripheral configuration such that they surround said laser beam source.

5. The laser transmitter of claim 1 in which said panel support of elastomeric material engages said plurality of transparent panels and supports said panels in a peripheral configuration such that they surround said laser beam source, and in which said plurality of transparent panels comprises four panels, generally trapezoidal in shape, and said plurality of openings comprises four trapezoidal openings.

6. The laser transmitter of claim 5 in which said panel support of elastomeric material engages said plurality of transparent panels and supports said panels in a peripheral configuration such that they surround said laser beam source, and in which said each of said panels has an isosceles trapezoid shape and substantially parallel upper and lower edges, with said upper edge being longer than said lower edge, said panels further having right and left non-parallel beveled edges.

7. Apparatus for projecting a laser beam in a reference plane, comprising:
    a housing,
    a laser in said housing for generating a laser beam,
    a beam diverting assembly mounted for receiving said laser beam and deflecting said laser beam outwardly from said housing in said reference plane,
    an arrangement for rotating said beam diverting assembly, thereby rotating said beam in said reference plane, and
    a lighthouse overlying said beam diverting assembly and mounted on said housing to allow transmission of said laser beam there through, said lighthouse including a plurality of transparent panels arranged circumferentially around said beam diverting assembly, each panel having a four sided shape with four panel edges, and a panel support of elastomeric material for holding said transparent panels, said panel support defining a plurality of openings, each transparent panel being mounted in one of said openings and held therein by retaining grooves in said support that extend along all of the edges of said opening, whereby each of said panels is received into said grooves and held in place in said panel support along the full extent of each of said four panel edges.

8. The apparatus of claim 7, in which each of said transparent panels is shaped generally as an isosceles trapezoid having upper and lower parallel edges, and in which said upper edges are shorter than said lower edges.

9. The apparatus of claim 7 in which each of said transparent panels has right and left non-parallel beveled edges.

10. The apparatus of claim 7 in which the generally vertical inner edges of each of said openings of said panel support are beveled to minimize the amount by which the beam is blocked as it is swept past said edges of each of said openings.

11. The apparatus of claim 7 further comprising a lighthouse cover supported over said lighthouse by said housing and covering said lighthouse.

12. A lighthouse for enclosing, at least in part, a laser beam source while permitting a beam of light generated by said laser beam source to be projected there through, comprising:
    a plurality of transparent panels, each panel having a four sided shape with four panel edges, and
    a panel support of elastomeric material for engaging said plurality of transparent panels and supporting said panels in a peripheral configuration such that they surround said laser beam source, said panel support defining a plurality of openings, each transparent panel being mounted in one of said openings and held therein by retaining grooves in said support that extend along all of the edges of said opening, whereby each of said panels is received into said grooves and held in place in said panel support along the full extent of each of said four panel edges.

13. The lighthouse of claim 12 in which each of said transparent panels is in the shape of an isosceles trapezoid, having upper and lower parallel edges.

14. The lighthouse of claim 13 in which the right and left non-parallel edges of said transparent panels are beveled.

15. The lighthouse of claim 12 each of said transparent panels is generally shaped as an isosceles trapezoid, having upper and lower parallel edges.

16. The lighthouse of claim 15 in which said openings of said panel support are beveled to minimize the amount of the beam that is blocked as said beam is swept past said edges of each of said openings.

\* \* \* \* \*

UNITED STATES PATENT AND TRADEMARK OFFICE
CERTIFICATE OF CORRECTION

PATENT NO. : 8,915,626 B2
APPLICATION NO. : 11/130831
DATED : December 23, 2014
INVENTOR(S) : Gert Lettermann It is certified that error appears in the above-identified patent and that said Letters Patent is hereby corrected as shown below:

On the Title Page, Item (73) Assignee, Line 2:, Delete "Kaiserlautern (DE)"

Insert --Kaiserslautern (DE)--

Signed and Sealed this
Twenty-third Day of June, 2015

Michelle K. Lee
*Director of the United States Patent and Trademark Office*